US012645653B2

(12) United States Patent
Repaka et al.

(10) Patent No.: US 12,645,653 B2
(45) Date of Patent: Jun. 2, 2026

(54) PREFETCHING SYSTEM AND METHOD FOR A FILE SYSTEM IN USER SPACE

(71) Applicant: Capital One Services, LLC, McLean, VA (US)

(72) Inventors: Venkata Rama Kalyan Repaka, Prosper, TX (US); Sikkandar Packiam, McKinney, TX (US); Ganesh Kumar Raja Shanmuga Sundaram, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/753,131

(22) Filed: Jun. 25, 2024

(65) Prior Publication Data

US 2025/0390476 A1     Dec. 25, 2025

(51) Int. Cl.
| | |
|---|---|
| *G06F 16/215* | (2019.01) |
| *G06F 11/07* | (2006.01) |
| *G06F 16/21* | (2019.01) |
| *G06F 16/23* | (2019.01) |

(52) U.S. Cl.
CPC ........ *G06F 16/215* (2019.01); *G06F 11/0769* (2013.01); *G06F 16/219* (2019.01); *G06F 16/2379* (2019.01)

(58) Field of Classification Search
CPC ............................ G06F 16/215; G06F 3/04847
See application file for complete search history.

(56) References Cited

U.S. PATENT DOCUMENTS

| | | | |
|---|---|---|---|
| 11,301,812 B2 | 4/2022 | Egozi et al. | |
| 2016/0306827 A1* | 10/2016 | Dos Santos | ............. G06F 16/25 |
| 2016/0364434 A1 | 12/2016 | Spitz et al. | |
| 2022/0283996 A1 | 9/2022 | Lecaillon et al. | |
| 2022/0365873 A1* | 11/2022 | Agee | ................... G06F 11/3684 |
| 2023/0065530 A1* | 3/2023 | Mohanty | ............. G06F 11/3608 |
| 2023/0214368 A1 | 7/2023 | Ye et al. | |
| 2024/0134835 A1 | 4/2024 | Creath et al. | |

OTHER PUBLICATIONS

D. Larson, et al., "A Review and Future Direction of Agile, Business Intelligence, Analytics and Data Science," International Journal of Information Management, vol. 36, Issue 5, Oct. 2016, 25 pages.
Co-pending U.S. Appl. No. 18/406,712, filed Jan. 8, 2024.
International Search Report and Written Opinion for Application No. PCT/US2025/034952, mailed Oct. 23, 2025, 14 pages.

* cited by examiner

*Primary Examiner* — Maher N Algibhah
(74) *Attorney, Agent, or Firm* — Harrity & Harrity, LLP

(57) ABSTRACT

In some implementations, an analysis system may receive, using at least one first crawler, a set of configurations associated with a plurality of data structures. The analysis system may receive, using at least one second crawler, a set of data lineages associated with the plurality of data structures. The analysis system may receive, using at least one third crawler, a set of quality rules being applied to the plurality of data structures. The analysis system may generate at least one score for each data structure, in the plurality of data structures, using the set of configurations, the set of data lineages, and the set of quality rules. The analysis system may transmit instructions for a user interface including the at least one score for each dataset.

20 Claims, 11 Drawing Sheets

100

145
Determine set of
refresh schedules

Analysis
system

140
Set of run
rates

135
Request

Data
orchestrator

100

Analysis system

165
Generate scores

170
Instructions for UI

175
Output the UI

Administrator device

100

Analysis
system

180
Detect error

185
Alert

190
Output the alert

Administrator
device

400

Bus
410

Processor
420

Memory
430

Input
Component
440

Output
Component
450

Communication
Component
460

500

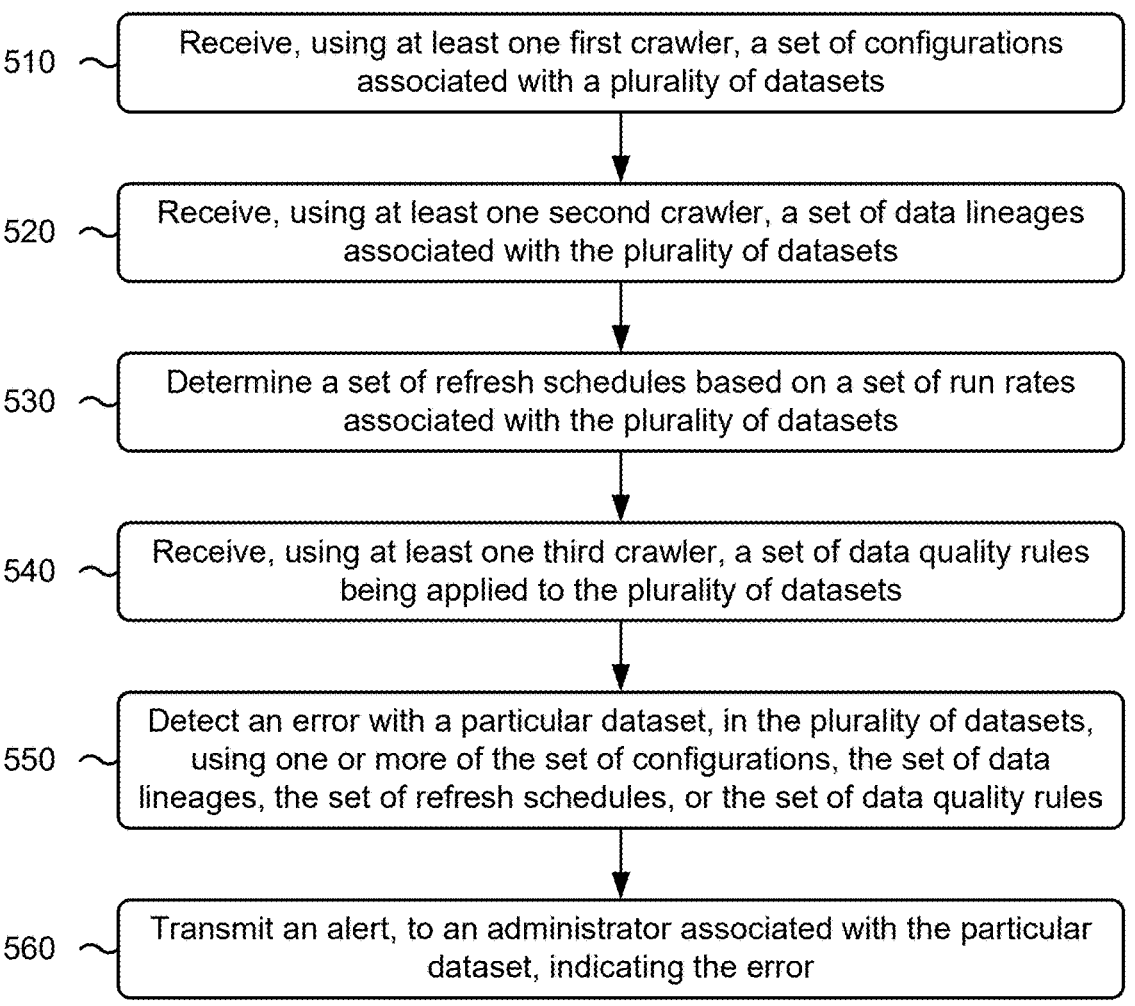

510 — Receive, using at least one first crawler, a set of configurations associated with a plurality of datasets 520 — Receive, using at least one second crawler, a set of data lineages associated with the plurality of datasets 530 — Determine a set of refresh schedules based on a set of run rates associated with the plurality of datasets 540 — Receive, using at least one third crawler, a set of data quality rules being applied to the plurality of datasets 550 — Detect an error with a particular dataset, in the plurality of datasets, using one or more of the set of configurations, the set of data lineages, the set of refresh schedules, or the set of data quality rules 560 — Transmit an alert, to an administrator associated with the particular dataset, indicating the error

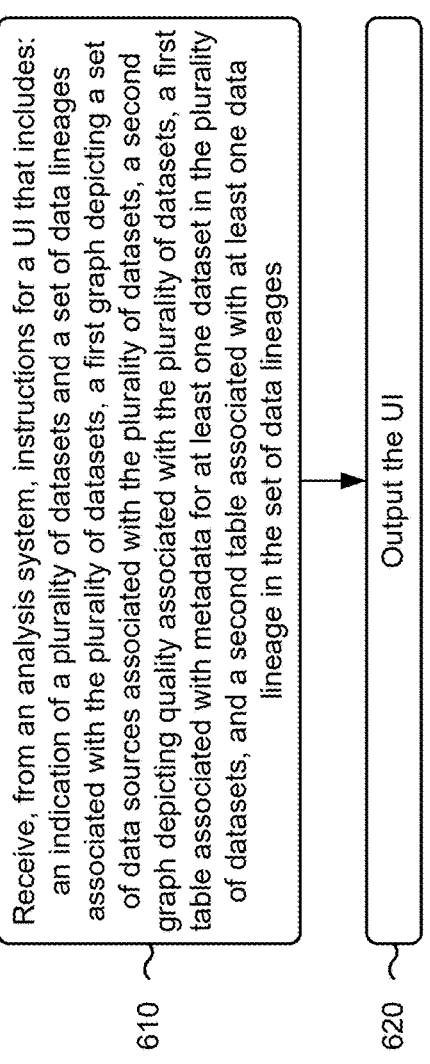

Receive, from an analysis system, instructions for a UI that includes: an indication of a plurality of datasets and a set of data lineages associated with the plurality of datasets, a first graph depicting a set of data sources associated with the plurality of datasets, a second graph depicting quality associated with the plurality of datasets, a first table associated with metadata for at least one dataset in the plurality of datasets, and a second table associated with at least one data lineage in the set of data lineages

610

Output the UI

620

FIG. 6

PREFETCHING SYSTEM AND METHOD FOR A FILE SYSTEM IN USER SPACE

BACKGROUND

As data storage becomes cheaper, a large set of data sources (e.g., sets of unstructured data and/or sets of structured data) may serve to support numerous datasets. For example, some datasets may be direct copies of a data source while other datasets are derived from one or more data sources (e.g., by reducing a data source, by supplementing a data source with another data source, or by combining multiple data sources).

SUMMARY

Some implementations described herein relate to a system for analysis of datasets and data lineage. The system may include one or more memories and one or more processors communicatively coupled to the one or more memories. The one or more processors may be configured to receive, using at least one first crawler, a set of configurations associated with a plurality of datasets. The one or more processors may be configured to receive, using at least one second crawler, a set of data lineages associated with the plurality of datasets. The one or more processors may be configured to determine a set of refresh schedules based on a set of run rates associated with the plurality of datasets. The one or more processors may be configured to receive, using at least one third crawler, a set of data quality rules being applied to the plurality of datasets. The one or more processors may be configured to detect an error with a particular dataset, in the plurality of datasets, using one or more of the set of configurations, the set of data lineages, the set of refresh schedules, or the set of data quality rules. The one or more processors may be configured to transmit an alert, to an administrator associated with the particular dataset, indicating the error.

Some implementations described herein relate to a method of providing user interfaces (UIs) for datasets and data lineage analysis. The method may include receiving, from an analysis system and at a user device, instructions for a UI, wherein the UI includes an indication of a plurality of datasets and a set of data lineages associated with the plurality of datasets a first graph depicting a set of data sources associated with the plurality of datasets a second graph depicting quality associated with the plurality of datasets a first table associated with metadata for at least one dataset in the plurality of datasets a second table associated with at least one data lineage in the set of data lineages. The method may include outputting, by the user device, the UI.

Some implementations described herein relate to a non-transitory computer-readable medium that stores a set of instructions for analysis of datasets and data lineage. The set of instructions, when executed by one or more processors of a device, may cause the device to receive, using at least one first crawler, a set of configurations associated with a plurality of data structures. The set of instructions, when executed by one or more processors of the device, may cause the device to receive, using at least one second crawler, a set of data lineages associated with the plurality of data structures. The set of instructions, when executed by one or more processors of the device, may cause the device to receive, using at least one third crawler, a set of quality rules being applied to the plurality of data structures. The set of instructions, when executed by one or more processors of the device, may cause the device to generate at least one score for each data structure, in the plurality of data structures, using the set of configurations, the set of data lineages, and the set of quality rules. The set of instructions, when executed by one or more processors of the device, may cause the device to transmit instructions for a UI including the at least one score for each dataset.

BRIEF DESCRIPTION OF THE DRAWINGS

FIGS. 5-6 are flowcharts of example processes relating to dataset and data lineage analysis, in accordance with some embodiments of the present disclosure.

DETAILED DESCRIPTION

The following detailed description of example implementations refers to the accompanying drawings. The same reference numbers in different drawings may identify the same or similar elements.

Data sources (e.g., sets of unstructured data and/or sets of structured data) may be assessed by machine learning models and/or rules (e.g., regular expressions, also referred to as "regexes") for quality. However, data sources may serve to support numerous datasets. For example, some datasets may be direct copies of a data source while other datasets are derived from one or more data sources (e.g., by reducing a data source, by supplementing a data source with another data source, or by combining multiple data sources). Therefore, determining quality of the data sources may result in missed errors in derived datasets, which may result in downtime and wasted power and processing resources in diagnosing and resolving errors in derived datasets.

Additionally, different data quality rules may apply to different datasets. Therefore, an administrator in charge of multiple datasets may use an administrator device to sort through multiple reports and/or different monitoring applications to assess the datasets. As a result, power and processing resources are consumed at the administrator device whenever the administrator switches between reports and/or monitoring applications. Additionally, latency is increased in identifying and resolving errors in the datasets.

Some implementations described herein enable a set of crawlers to gather configurations related to datasets as well as data lineages and data quality rules. As a result, errors in derived datasets are more likely to be found based on the data lineages, which reduces downtime and conserves power and processing resources that otherwise would have been spent in diagnosing and resolving the errors. Additionally, the set of crawlers enables a single interface for assessing the datasets (and compliance with the data quality rules). As a result, power and processing resources are conserved that otherwise would have been spent in switching between reports and/or monitoring applications. Additionally, latency is decreased in identifying and resolving errors in the datasets.

FIGS. 1A-1F are diagrams of an example 100 associated with dataset and data lineage analysis. As shown in FIGS. 1A-1F, example 100 includes an administrator device, an analysis system, a dataset repository, a code repository, a data orchestrator, and a data quality tool. These devices are described in more detail in connection with FIGS. 3 and 4.

Figure 1A:
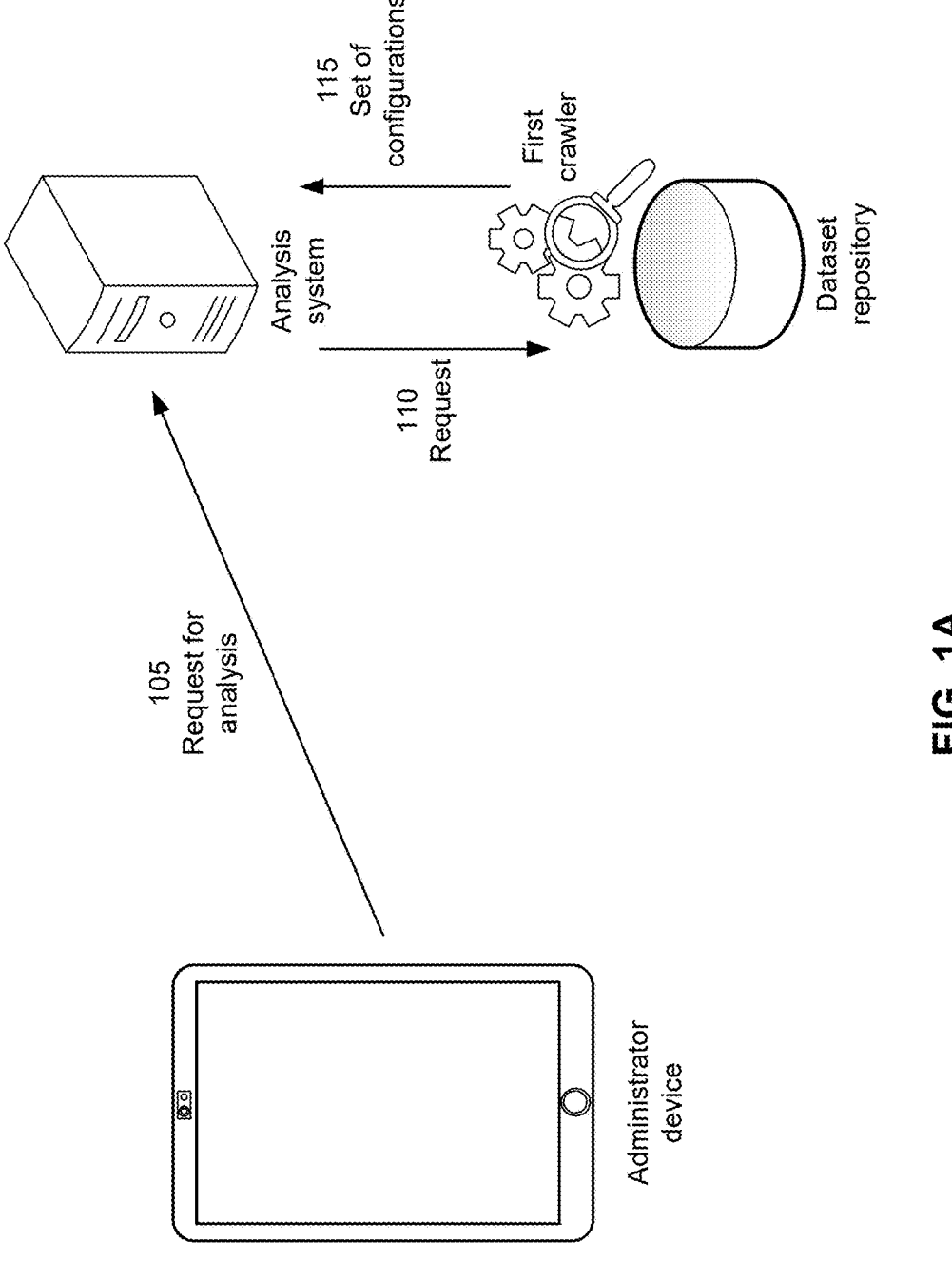
FIGS. 1A-IF are diagrams of an example implementation relating to dataset and data lineage analysis, in accordance with some embodiments of the present disclosure.

As shown in FIG. 1A and by reference number 105, the administrator device may transmit, and the analysis system may receive, a request for analysis of a plurality of datasets (e.g., associated with an administrator using the administrator device). The request may include a hypertext transfer protocol (HTTP) request and/or an application programming interface (API) call. In one example, the administrator may provide input (e.g., via an input component of the administrator device), using a command line, a bash shell, or another type of text interface, that triggers the administrator device to transmit the request. Alternatively, the administrator device may output a user interface (UI), and the administrator may provide the input, that triggers the administrator device to transmit the request, by interacting with the UI (e.g., via an input component of the administrator device). For example, the administrator device may execute a web browser, and the administrator may provide the input by interacting with a UI of the web browser.

The request may indicate the plurality of datasets (e.g., in a header and/or as an argument). For example, the request may indicate names and/or locations associated with the plurality of datasets. The locations may include filenames, file paths, alphanumeric identifiers associated with the plurality of datasets, and/or other types of identifiers that indicate where the plurality of datasets are stored. Additionally, or alternatively, the locations may include Internet protocol (IP) addresses, medium access control (MAC) addresses, and/or other types of identifiers of the dataset repository that stores the plurality of datasets. Additionally, or alternatively, the request may indicate the administrator (e.g., a name, an email address, a username, and/or another type of identifier associated with the administrator).

In some implementations, the administrator device may include a set of credentials in the request. The set of credentials may be associated with the dataset repository. The set of credentials may include a username and password, a passcode, a secret answer, a certificate, a private key, and/or biometric information, among other examples. The set of credentials may allow the analysis system to access the plurality of datasets from the dataset repository, as described in connection with reference numbers 110 and 115. Although described as included in the request, the set of credentials may be transmitted separately. For example, the analysis system may transmit, and the administrator device may receive, a request for credentials in response to the request. Accordingly, the administrator device may transmit the set of credentials in response to the request from the analysis system. Alternatively, the administrator device may transmit, and the analysis system may receive, the set of credentials, such that the analysis system may verify the set of credentials and accept the request from the administrator device based on verifying the set of credentials.

As shown by reference number 110, the analysis system may transmit, and the dataset repository may receive, a request for a set of configurations associated with the plurality of datasets. The analysis system may transmit, and the dataset repository may receive, the request for the set of configurations in response to the request from the administrator device. The request for the set of configurations may include an HTTP request, a file transfer protocol (FTP) request, and/or an API call. The request may indicate the plurality of datasets (e.g., in a header and/or as an argument). Although the example 100 is described in connection with the dataset repository being a single entity, other examples may include a plurality of data sources forming the dataset repository. Accordingly, the analysis system may transmit a plurality of requests (e.g., to the plurality of data sources on a one-to-one basis or a many-to-one basis).

As shown by reference number 115, the dataset repository may transmit, and the analysis system may receive, the set of configurations associated with the plurality of datasets. The dataset repository may transmit, and the analysis system may receive, the set of configurations in response to the request from the analysis system. In some implementations, the dataset repository may transmit, and the analysis system may receive, a set of configuration files that encode the set of configurations. For example, a configuration file may include a database configuration file, an index associated with a dataset, and/or another type of file encoding metadata associated with the dataset.

As shown in FIG. 1A, the analysis system may receive the set of configurations using a first crawler (e.g., at least one first crawler). The analysis system may configure the first crawler based on the request from the administrator device described above. For example, the first crawler may be configured to retrieve all configuration files associated with datasets that are assigned to the administrator. The first crawler may query for (and thus request) configuration files that indicate the administrator (e.g., using a name, an email address, a username, and/or another type of identifier associated with the administrator).

Although the example 100 is described in connection with a plurality of datasets, other examples may include a set of configurations associated with a plurality of data structures. For example, the plurality of data structures may be a plurality of machine learning models or a plurality of APIs, among other examples. Therefore, the analysis system may receive a set of configurations associated with the plurality of data structures.

Figure 1B:
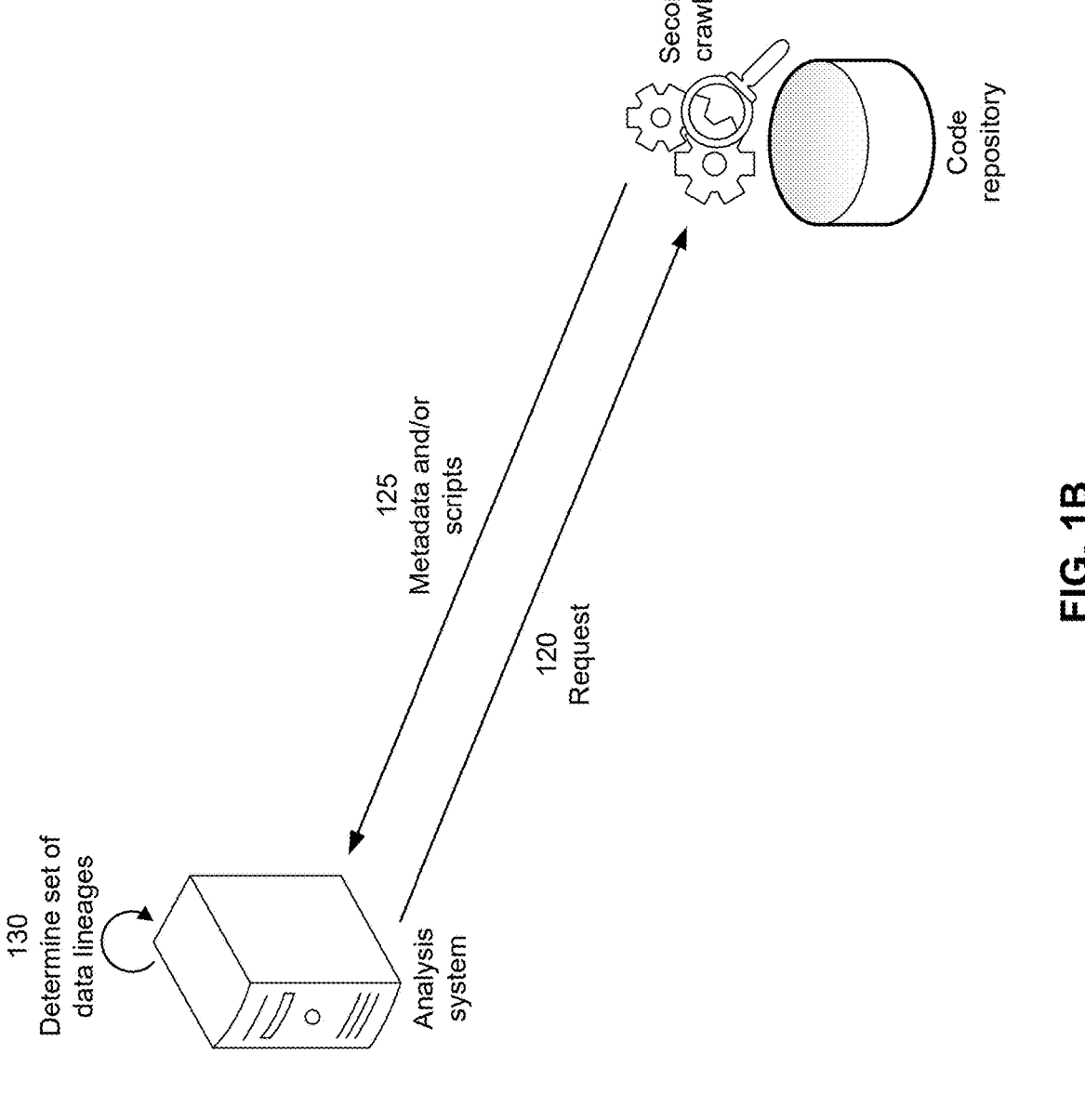

As shown in FIG. 1B and by reference number 120, the analysis system may transmit, and the code repository may receive, a request for a set of data lineages associated with the plurality of datasets. The analysis system may transmit, and the code repository may receive, the request for the set of data lineages in response to the request from the administrator device. The request for the set of data lineages may include an HTTP request, an FTP request, and/or an API call. The request may indicate the plurality of datasets (e.g., in a header and/or as an argument). Although the example 100 is described in connection with the code repository being a single entity, other examples may include a plurality of data sources forming the code repository. Accordingly, the analysis system may transmit a plurality of requests (e.g., to the plurality of data sources on a one-to-one basis or a many-to-one basis).

As shown by reference number 125, the code repository may transmit, and the analysis system may receive, metadata and/or scripts (e.g., one or more scripts) associated with the plurality of datasets. The code repository may transmit, and the analysis system may receive, the metadata and/or the scripts in response to the request from the analysis system. The metadata may indicate which data sources feed into the plurality of datasets. Similarly, the scripts may include code that is executed to generate the plurality of datasets from the data sources. A "script" may include a set of Bourne Again Shell (BASH) instructions, a set of Python instructions, and/or another set of sequential instructions for execution.

As shown in FIG. 1B, the analysis system may receive the metadata and/or the scripts using a second crawler (e.g., at least one second crawler). The analysis system may configure the second crawler based on the request from the administrator device described above. For example, the second crawler may be configured to retrieve all metadata and/or scripts associated with the plurality of datasets. The second crawler may query for (and thus request) metadata and/or scripts that indicate a dataset (e.g., at least one dataset) in the plurality of datasets (e.g., using a name and/or a location associated with the dataset).

As shown by reference number 130, the analysis system may determine the set of data lineages from the metadata and the scripts. In one example, the metadata may indicate that a dataset (e.g., at least one dataset) in the plurality of datasets originates from reduction of a data source or from combination of multiple data sources. In another example, one of the scripts may indicate that an operation (or a set of operations) used to reduce a data source and/or combine multiple data sources to generate a dataset (e.g., at least one dataset) in the plurality of datasets. Therefore, the analysis system may determine a data lineage (e.g., a set of data sources and a series of operations performed thereon) for each dataset in the plurality of datasets. Therefore, the set of data lineages may have a one-to-one correlation with the plurality of datasets.

Although the example 100 is described in connection with a plurality of datasets, other examples may include a set of data lineages associated with a plurality of data structures. For example, the plurality of data structures may be a plurality of machine learning models or a plurality of APIs, among other examples. Therefore, the analysis system may receive (or determine) a set of data lineages associated with the plurality of data structures.

Figure 1C:
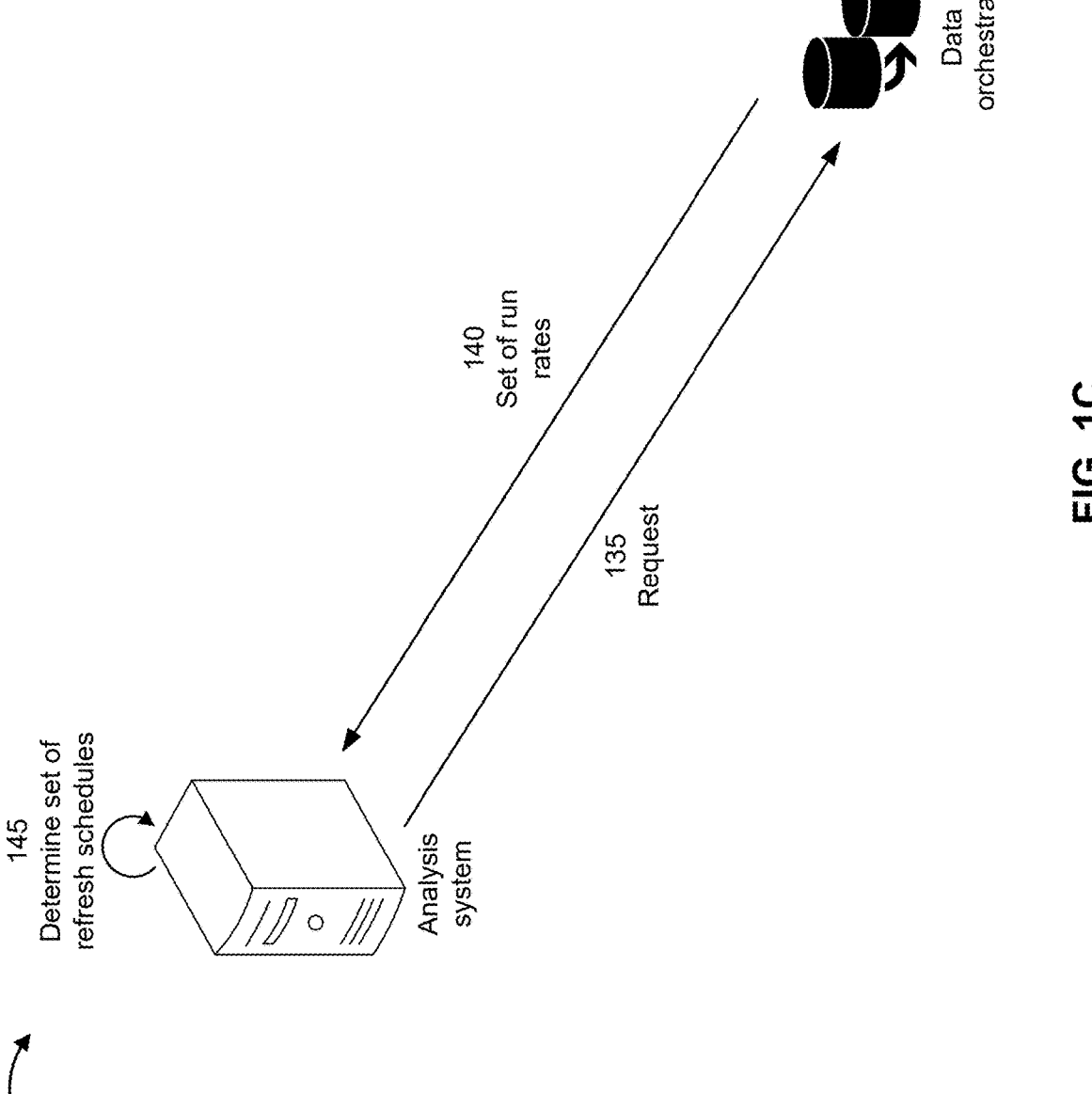

As shown in FIG. 1C and by reference number 135, the analysis system may transmit, and the data orchestrator may receive, a request for a set of run rates associated with (at least a portion of) the plurality of datasets. The analysis system may transmit, and the data orchestrator may receive, the request for the set of run rates in response to the request from the administrator device. The request for the set of run rates may include an HTTP request, an FTP request, and/or an API call. The request may indicate the plurality of datasets (e.g., in a header and/or as an argument). Although the example 100 is described in connection with the data orchestrator being a single entity, other examples may include a plurality of instances (e.g., in a cloud computing system) forming the data orchestrator. Accordingly, the analysis system may transmit a plurality of requests (e.g., to the plurality of instances on a one-to-one basis or a many-to-one basis).

As shown by reference number 140, the data orchestrator may transmit, and the analysis system may receive, the set of run rates associated with (at least a portion of) the plurality of datasets. The data orchestrator may transmit, and the analysis system may receive, the set of run rates in response to the request from the analysis system. A "run rate" may indicate how frequently a dataset (e.g., at least one dataset) in the plurality of datasets is generated (or updated). For example, a script associated with the dataset may be scheduled (e.g., by the data orchestrator) to execute twice per day (e.g., indicating a run rate of every 12 hours). In another example, metadata associated with the dataset (e.g., and processed by the data orchestrator) may indicate that the dataset updates, on average, every hour (e.g., indicating a run rate of every 1 hour).

As shown by reference number 145, the analysis system may determine a set of refresh schedules based on the set of run rates. In one example, a run rate may directly indicate a refresh schedule (e.g., every 12 hours or every hour, as described in the examples above). In another example, a run rate may indicate that a dataset (e.g., at least one dataset) in the plurality of datasets is generated (or updated) once per day, and the analysis system may determine a refresh schedule of 8:00 pm every day (e.g., based on the metadata associated with the dataset and processed by the data orchestrator and/or based on the script associated with the dataset and scheduled by the data orchestrator, as described above).

Although the example 100 is described in connection with a plurality of datasets, other examples may include a set of refresh schedules associated with a plurality of data structures. For example, the plurality of data structures may be a plurality of machine learning models or a plurality of APIs, among other examples. Therefore, the analysis system may receive (or determine) a set of refresh schedules associated with the plurality of data structures.

Figure 1D:
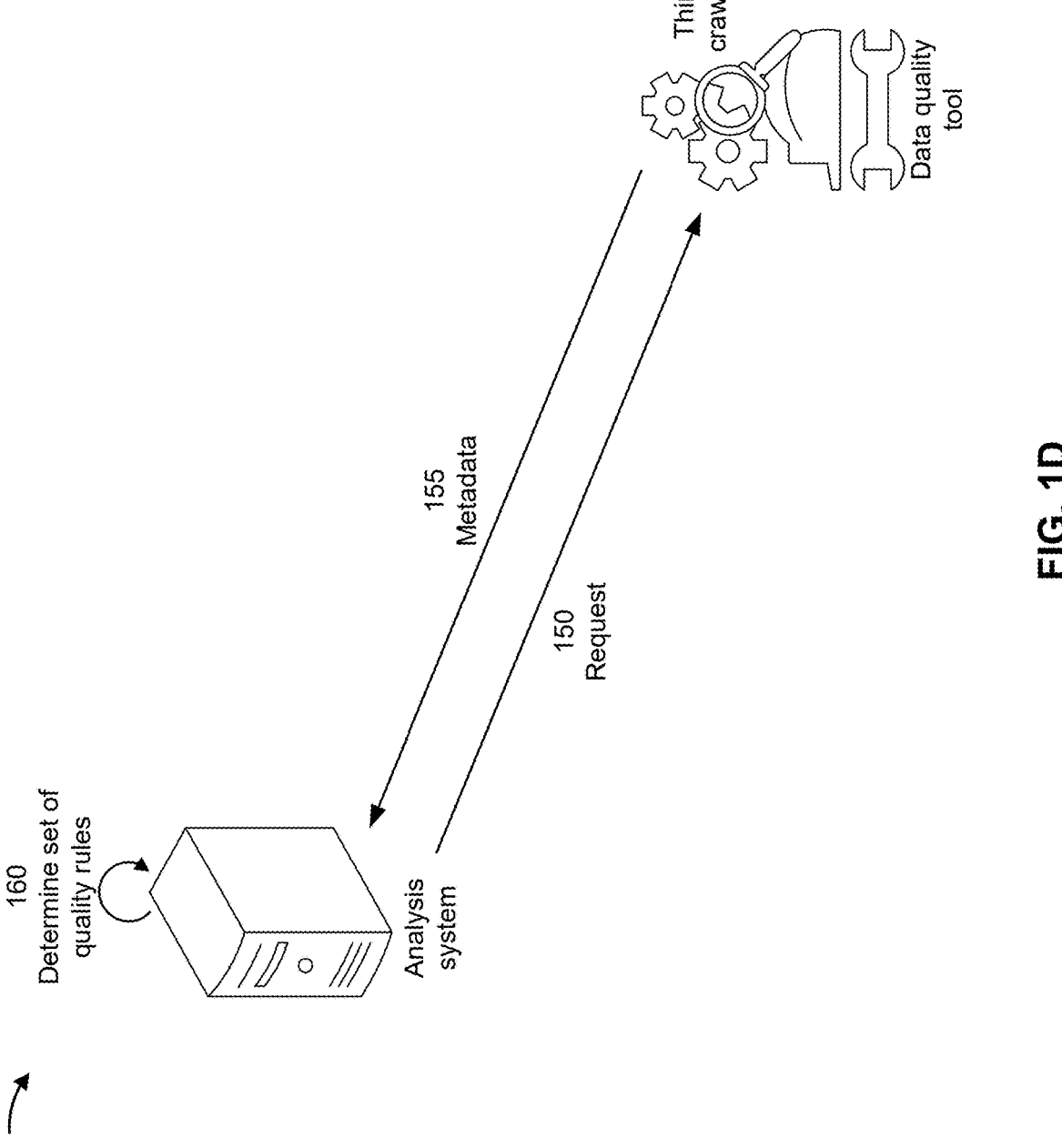

As shown in FIG. 1D and by reference number 150, the analysis system may transmit, and the data quality tool may receive, a request for a set of data quality rules associated with the plurality of datasets. The analysis system may transmit, and the data quality tool may receive, the request for the set of data quality rules in response to the request from the administrator device. The request for the set of data quality rules may include an HTTP request, an FTP request, and/or an API call. The request may indicate the plurality of datasets (e.g., in a header and/or as an argument). Although the example 100 is described in connection with the data quality tool being a single entity, other examples may include a plurality of instances (e.g., in a cloud computing system) forming the data quality tool. Accordingly, the analysis system may transmit a plurality of requests (e.g., to the plurality of instances on a one-to-one basis or a many-to-one basis).

As shown by reference number 155, the data quality tool may transmit, and the analysis system may receive, first metadata associated with application of the set of data quality rules and/or second metadata associated with application of a set of data protection rules. The data quality tool may transmit, and the analysis system may receive, the (first and/or second) metadata in response to the request from the analysis system. The first metadata may include regexes associated with the set of data quality rules and/or log files resulting from application of the set of data quality rules to the plurality of datasets, among other examples. Similarly, the second metadata may include regexes associated with the set of data protection rules and/or log files resulting from application of the set of data protection rules to the plurality of datasets, among other examples.

As shown in FIG. 1D, the analysis system may receive the (first and/or second) metadata using a third crawler (e.g., at least one third crawler). The analysis system may configure the third crawler based on the request from the administrator device described above. For example, the third crawler may be configured to retrieve metadata associated with all rules applied to the plurality of datasets. The third crawler may query for (and thus request) metadata that indicates a dataset (e.g., at least one dataset) in the plurality of datasets (e.g., using a name and/or a location associated with the dataset).

As shown by reference number 160, the analysis system may determine the set of data quality rules based on the (first and/or second) metadata. In one example, the first metadata may indicate outcomes of applying the set of data quality rules (e.g., in log files, as described above) such that the analysis system infers the set of data quality rules from the first metadata. Additionally, or alternatively, the first metadata may directly indicate the regexes that comprise the set of data quality rules. In another example, the second metadata may indicate outcomes of applying the set of data protection rules (e.g., in log files, as described above) such that the analysis system infers the set of data quality rules from the second metadata. Additionally, or alternatively, the second metadata may directly indicate the regexes that comprise the set of data protection rules (and thus comprise part of the set of data quality rules).

Although the example 100 is described in connection with a plurality of datasets, other examples may include a set of quality rules associated with a plurality of data structures. For example, the plurality of data structures may be a plurality of machine learning models or a plurality of APIs, among other examples. Therefore, the analysis system may receive (or determine) a set of quality rules associated with the plurality of data structures.

In some implementations, the analysis system may store the set of configurations, the set of data lineages, the set of refresh schedules, and/or the set of data quality rules. For example, the analysis system may cache the set of configurations, the set of data lineages, the set of refresh schedules, and/or the set of data quality rules in a local memory (or another storage) controlled by the analysis system. Additionally, or alternatively, the analysis system may store the set of configurations, the set of data lineages, the set of refresh schedules, and/or the set of data quality rules in a database that is at least partially separate (e.g., logically, physically, and/or virtually) from the analysis system. Therefore, the analysis system may process the set of configurations, the set of data lineages, the set of refresh schedules, and/or the set of data quality rules, as described in further detail below.

By using the crawlers to gather information about the plurality of datasets, the analysis system is more likely to detect errors in the plurality of datasets (e.g., as described in connection with FIG. 1F). As a result, downtime for the plurality of datasets is reduced and power and processing resources are conserved that otherwise would have been spent in diagnosing and resolving the errors.

Figure 1E:
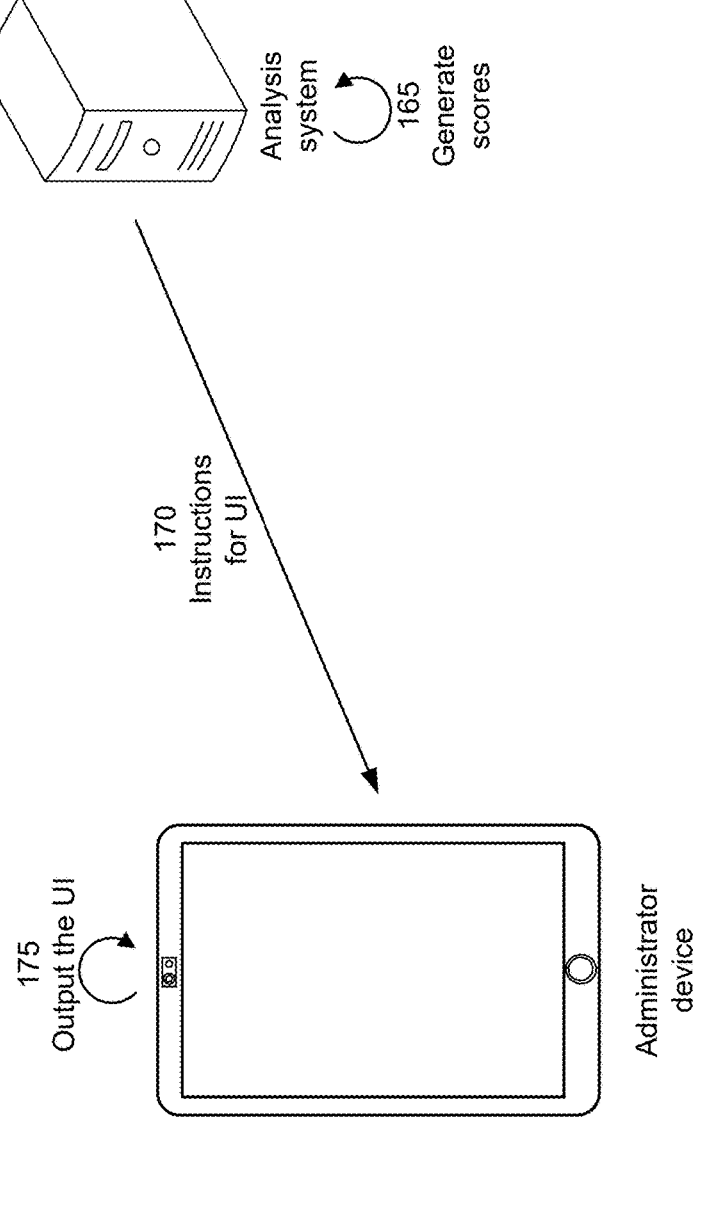

As shown in FIG. 1E and by reference number 165, the analysis system may generate a score (e.g., at least one score) for each dataset, in the plurality of datasets, using the set of configurations, the set of data lineages, the set of refresh schedules, and/or the set of data quality rules. For example, the analysis system may apply a formula (e.g., at least one formula) to the set of configurations, the set of data lineages, the set of refresh schedules, and/or the set of data quality rules in order to calculate the score for each dataset. In another example, the analysis system may provide the set of configurations, the set of data lineages, the set of refresh schedules, and/or the set of data quality rules to a machine learning model in order to receive the score for each dataset. For example, the analysis system may transmit, and a machine learning host (e.g., associated with the machine learning model) may receive, a request including the set of configurations, the set of data lineages, the set of refresh schedules, and/or the set of data quality rules. The machine learning model may be trained (e.g., by the machine learning host and/or a device at least partially separate from the machine learning host) using labeled information about datasets (e.g., for supervised learning). The machine learning model may be configured to output a matrix of scores (or another type of set of scores) for the plurality of datasets. Additionally, or alternatively, the machine learning model model may be trained using unlabeled information about datasets (e.g., for deep learning). The machine learning model may be configured to cluster the plurality of datasets with other, related datasets in order to generate the matrix of scores (e.g., based on scores associated with datasets in a same cluster).

In some implementations, the machine learning model may include a regression algorithm (e.g., linear regression or logistic regression), which may include a regularized regression algorithm (e.g., Lasso regression, Ridge regression, or Elastic-Net regression). Additionally, or alternatively, the machine learning model may include a decision tree algorithm, which may include a tree ensemble algorithm (e.g., generated using bagging and/or boosting), a random forest algorithm, or a boosted trees algorithm. A model parameter may include an attribute of a model that is learned from data input into the model (e.g., information about front-end devices). For example, for a regression algorithm, a model parameter may include a regression coefficient (e.g., a weight). For a decision tree algorithm, a model parameter may include a decision tree split location, as an example.

Additionally, the machine learning host (and/or a device at least partially separate from the machine learning host) may use one or more hyperparameter sets to tune the machine learning model. A hyperparameter may include a structural parameter that controls execution of a machine learning algorithm by the analysis system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

As shown by reference number 170, the analysis system may transmit, and the administrator device may receive, instructions for a UI including the score for each dataset. Accordingly, as shown by reference number 175, the administrator device may output (e.g., using an output component) the UI to the administrator.

In some implementations, the UI may be as described in connection with FIG. 2. For example, the UI may include an indication of the plurality of datasets and the set of data lineages associated with the plurality of datasets (e.g., including a quantity of datasets in the plurality of datasets and a quantity of datasets associated with each data lineage in the set of data lineages), a first graph depicting a set of data sources associated with the plurality of datasets (e.g., a bar graph representing a quantity of datasets associated with each data source in the set of data sources), a second graph depicting quality associated with the plurality of datasets (e.g., a pie chart representing a quantity of active data sources in the set of data sources and a quantity of inactive data sources in the set of data sources), a first table associated with metadata for a dataset (e.g., at least one dataset) in the plurality of datasets (e.g., a list of derived datasets in the plurality of datasets), and a second table associated with a data lineage (e.g., at least one data lineage) in the set of data lineages (e.g., a list of the set of data sources that form a basis for the plurality of datasets).

Although the example 100 is described in connection with a plurality of datasets, other examples may include a score generated for each data structure in a plurality of data structures. For example, the plurality of data structures may be a plurality of machine learning models or a plurality of APIs, among other examples. Therefore, the analysis system may generate (or otherwise determine) scores associated with the plurality of data structures.

Figure 1F:
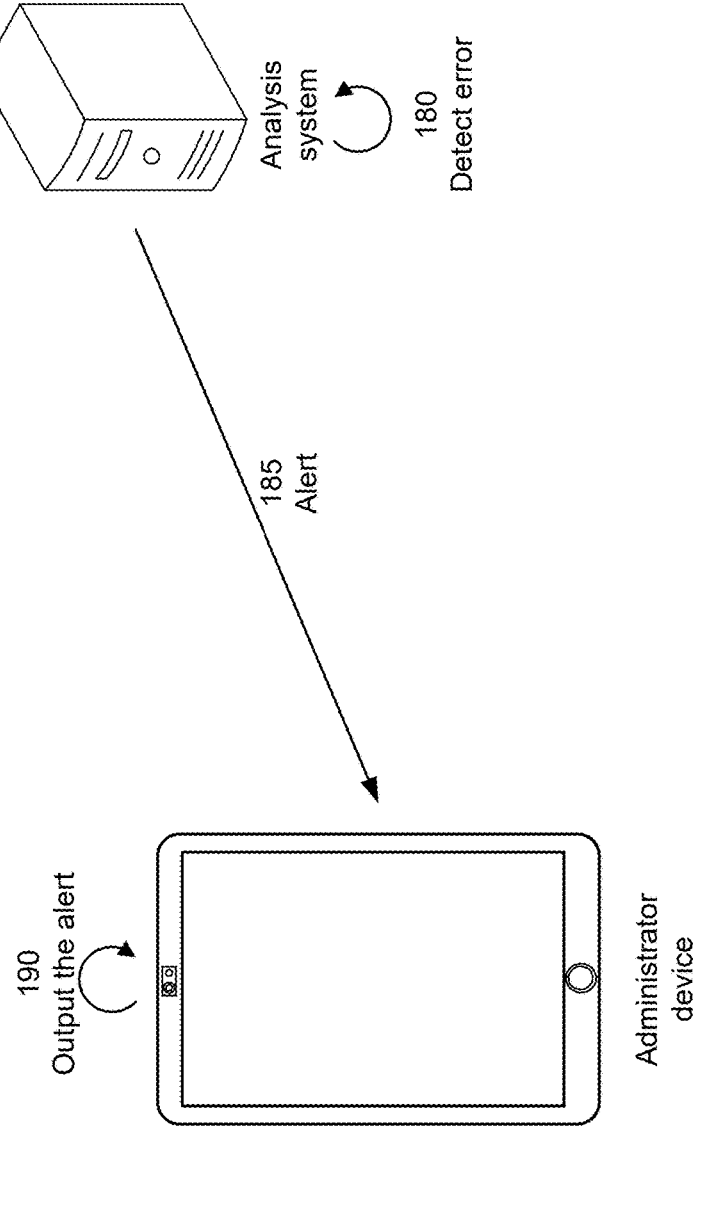

As shown in FIG. 1F, the analysis system may additionally or alternatively perform error detection and notification. As shown by reference number 180, the analysis system may detect an error with a particular dataset, in the plurality of datasets, using (one or more of) the set of configurations, the set of data lineages, the set of refresh schedules, or the set of data quality rules. The error may be a failure associated with a data lineage in the set of data lineages. For example, the analysis system may determine that a script to generate (or at least update) the particular dataset has failed to execute (or has crashed during execution). In another example, the analysis system may determine that a data source for the particular dataset has been deleted (or otherwise is inaccessible). The error may be a failure associated with a refresh schedule in the set of refresh schedules. For example, the analysis system may determine that the particular dataset has not been updated according to the refresh schedule. In another example, the analysis system may determine that a data source for the particular dataset has not been updated according to the refresh schedule. The error may be a failure associated with a data quality rule in the set of data quality rules. For example, the analysis system may determine that the particular dataset failed to pass (or otherwise comply with) the data quality rule. In another example, the analysis system may determine that the data quality rule failed to execute (or otherwise be applied to) the particular dataset.

Although the example 100 is described in connection with a particular dataset, other examples may include the analysis system detecting an error with a particular data structure in a plurality of data structures. For example, the plurality of data structures may be a plurality of machine learning models or a plurality of APIs, among other examples. Therefore, the analysis system may transmit an alert, as described below, associated with the particular data structure.

As shown by reference number 185, the analysis system may transmit, and the administrator device may receive, an alert indicating the error. The alert may be included in an email message, a text message, and/or a push notification, among other examples. The analysis system may transmit the alert to the administrator device based on the administrator device being associated with the administrator. The analysis system may determine, using a data structure mapping (i.e., that maps) dataset identifiers to user identifiers, the corresponding administrator responsible for (or at least associated with) the particular dataset. For example, the data converter may map a string representing the particular dataset (e.g., a name of the particular dataset) to a string representing the corresponding administrator (e.g., a name of the administrator, a username, and/or an email address, among other examples). As shown by reference number 190, the administrator device may output (e.g., using an output component) the alert to the administrator.

By using techniques as described in connection with FIGS. 1A-1F, the analysis system uses the crawlers to gather the set of configurations, the set of data lineages, and the set of data quality rules. As a result, errors in the plurality of datasets are more likely to be found, which reduces downtime and conserves power and processing resources that otherwise would have been spent in diagnosing and resolving the errors. Additionally, the crawlers enable a single UI for assessing the plurality of datasets (and compliance with the set of data quality rules). As a result, power and processing resources are conserved that otherwise would have been spent in switching between reports and/or monitoring applications. Additionally, latency is decreased in identifying and resolving errors in the plurality of datasets.

As indicated above, FIGS. 1A-1F are provided as an example. Other examples may differ from what is described with regard to FIGS. 1A-1F.

Figure 2:
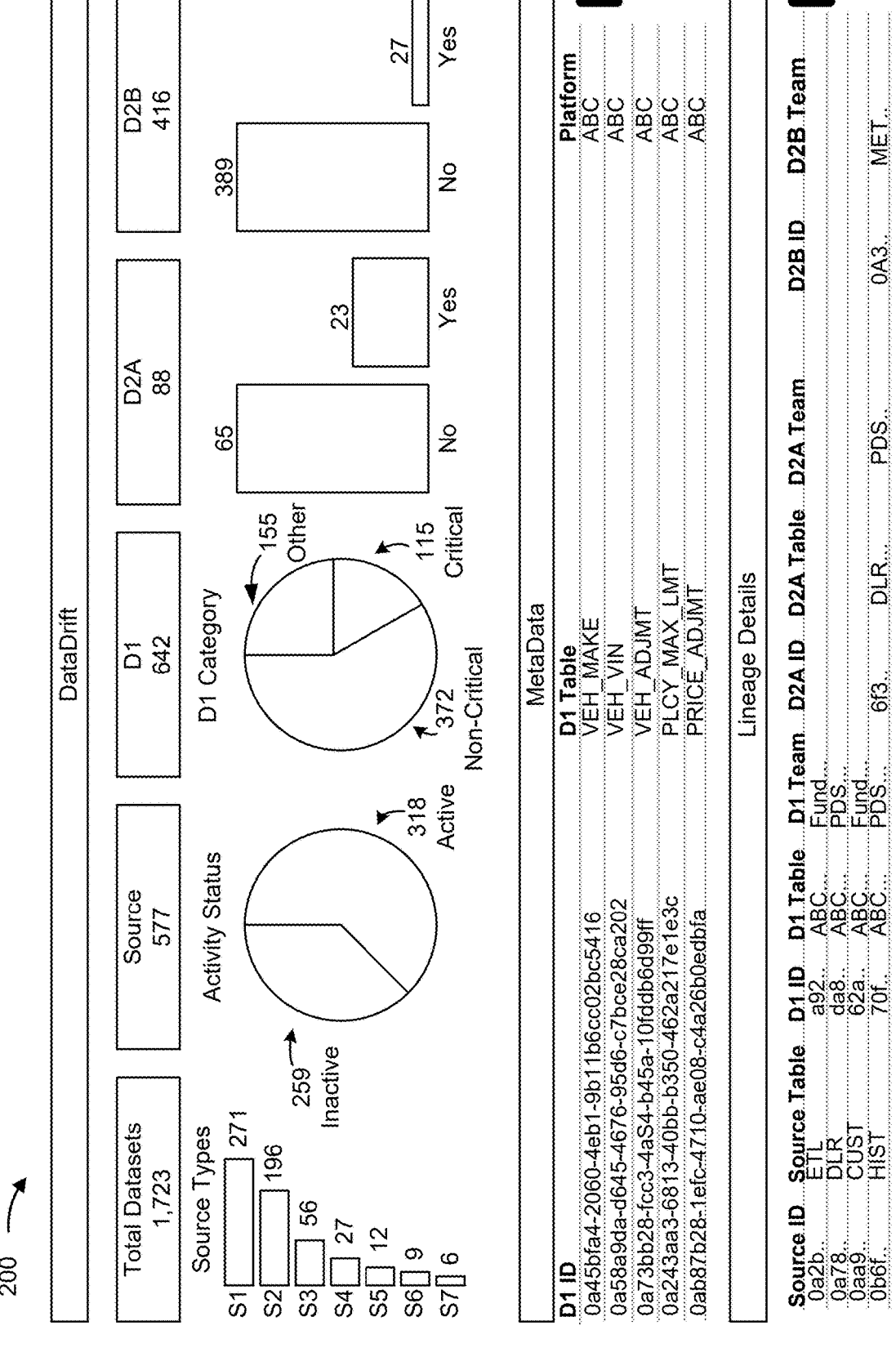
FIG. 2 is a diagram of an example user interface associated with dataset and data lineage analysis, in accordance with some embodiments of the present disclosure.

FIG. 2 is a diagram of an example UI 200 associated with dataset and data lineage analysis. The example UI 200 may be shown by an administrator device (e.g., based on instructions from an analysis system). These devices are described in more detail in connection with FIGS. 3 and 4.

As shown in FIG. 2, the example UI 200 may include an indication of a plurality of datasets. The example UI 200 includes a quantity of datasets in the plurality of datasets (which is "1,723" total datasets associated with an administrator who is using the administrator device). Additionally, the example UI 200 may include an indication of a set of data lineages associated with the plurality of datasets. The example UI 200 includes a quantity of datasets associated with each data lineage in the set of data lineages. FIG. 2 shows "577" datasets associated with a direct data lineage, "642" datasets associated with a single derivation (indicated by "D1") from one or more data sources, "88" datasets associated with two or more derivations, from one or more data sources, for internal use (indicated by "D2A"), and "416" datasets associated with two or more derivations, from one or more data sources, for external use (indicated by "D2B").

As shown in FIG. 2, the example UI 200 may further include a first graph depicting a set of data sources associated with the plurality of datasets. The example UI 200 includes a bar graph representing a quantity of datasets associated with each data source in the set of data sources. FIG. 2 shows "271" datasets deriving from a first data source (represented by "S1"), "196" datasets deriving from a second data source (represented by "S2"), "56" datasets deriving from a third data source (represented by "S3"), "27" datasets deriving from a fourth data source (represented by "S4"), "12" datasets deriving from a fifth data source (represented by "S5"), "9" datasets deriving from a sixth data source (represented by "S6"), and "6" datasets deriving from a seventh data source (represented by "S7"). Other types of graphs may be used in additional to, or in lieu of, a bar graph.

As further shown in FIG. 2, the example UI 200 may include a second graph depicting quality associated with the plurality of datasets. The example UI 200 includes a pie chart representing a quantity of active data sources in the set of data sources ("318" in FIG. 2) and a quantity of inactive data sources in the set of data sources ("259" in FIG. 2). Additionally, or alternatively, the example UI 200 may depict scores associated with the plurality of datasets (e.g., determined as described in connection with FIG. 1E). In FIG. 2, binary scores (represented by "Yes" or "No") are output for D2A datasets and D2B datasets, indicating whether an error is detected for any datasets ("23" D2A datasets and "27" D2B datasets may be associated with detected errors in FIG. 2). Other examples may include scores that are non-binary.

As shown in FIG. 2, the example UI 200 may further include a first table associated with metadata for at least one dataset in the plurality of datasets. The example UI 200 includes a list of derived datasets in the plurality of datasets (shown under "MetaData" in FIG. 2). As further shown in FIG. 2, example UI 200 may include a second table associated with at least one data lineage in the set of data lineages. The example UI 200 includes a list of the set of data sources that form a basis for the plurality of datasets (shown under "Lineage Details" in FIG. 2).

As indicated above, FIG. 2 is provided as an example. Other examples may differ from what is described with regard to FIG. 2. For example, a different total quantity of datasets and/or different quantities of datasets associated with each data lineage may be output. Additionally, or alternatively, the plurality of datasets may be related to more than seven data sources or fewer than seven data sources. Additionally, or alternatively, a different quantity of active data sources and/or a different quantity of inactive data sources may be output.

Figure 3:
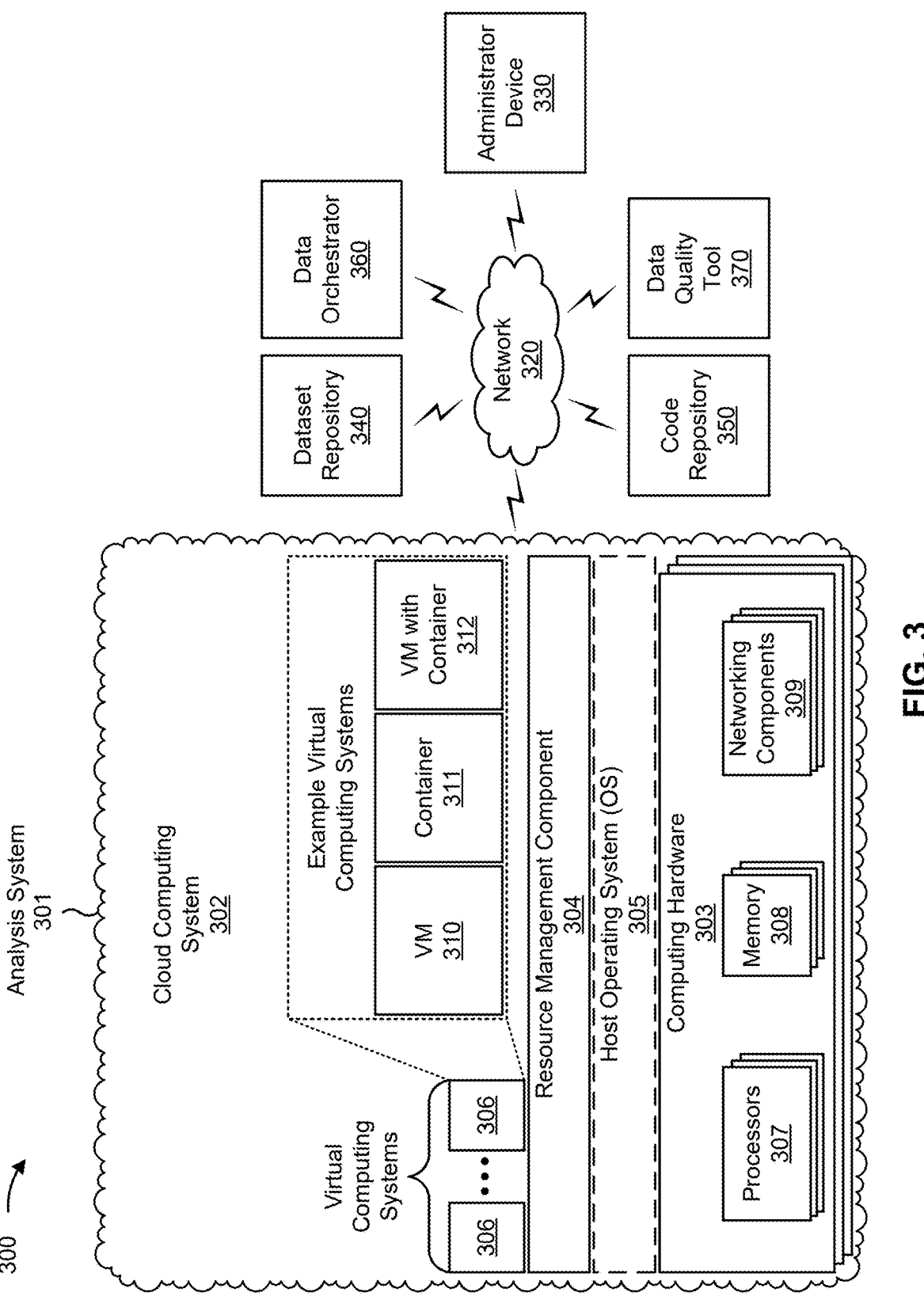
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include an analysis system 301, which may include one or more elements of and/or may execute within a cloud computing system 302. The cloud computing system 302 may include one or more elements 303-312, as described in more detail below. As further shown in FIG. 3, environment 300 may include a network 320, an administrator device 330, a dataset repository 340, a code repository 350, a data orchestrator 360, and/or a data quality tool 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the analysis system 301 may include one or more elements 303-312 of the cloud computing system 302, may execute within the cloud computing system 302, and/or may be hosted within the cloud computing system 302, in some implementations, the analysis system 301 may not be cloud-based (e.g., may be implemented outside of a cloud computing system) or may be partially cloud-based. For example, the analysis system 301 may include one or more devices that are not part of the cloud computing system 302, such as device 400 of FIG. 4, which may include a standalone server or another type of computing device. The analysis system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The administrator device 330 may include one or more devices capable of receiving, generating, storing, processing, and/or providing information associated with datasets, as described elsewhere herein. The administrator device 330 may include a communication device and/or a computing device. For example, the administrator device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The administrator device 330 may communicate with one or more other devices of environment 300, as described elsewhere herein.

The dataset repository 340 may include one or more devices capable of receiving, generating, storing, processing, and/or providing information associated with dataset configurations, as described elsewhere herein. The dataset repository 340 may include a communication device and/or a computing device. For example, the dataset repository 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The dataset repository 340 may include hardware used for Data Lake on Amazon Web Services® (AWS®) or Microsoft OneLake®, among other examples. The dataset repository 340 may communicate with one or more other devices of environment 300, as described elsewhere herein.

The code repository 350 may include one or more devices capable of receiving, generating, storing, processing, and/or providing information associated with metadata and/or scripts, as described elsewhere herein. For example, the code repository 350 may include Github® or SourceForge©, among other examples. The code repository 350 may include a communication device and/or a computing device. For example, the code repository 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The code repository 350 may communicate with one or more other devices of environment 300, as described elsewhere herein.

The data orchestrator 360 may include one or more devices capable of receiving, generating, storing, processing, and/or providing information associated with refresh rates and/or run rates, as described elsewhere herein. The data orchestrator 360 may include a communication device and/or a computing device. For example, the data orchestrator 360 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data orchestrator 360 may include hardware used for AWS Glue or Azure Data Factory, among other examples. The data orchestrator 360 may communicate with one or more other devices of environment 300, as described elsewhere herein.

The data quality tool 370 may include one or more devices capable of receiving, generating, storing, processing, and/or providing information associated with quality rules, as described elsewhere herein. The data quality tool 370 may include a communication device and/or a computing device. For example, the data quality tool 370 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data quality tool 370 may include hardware used for AWS Glue Data Quality or Microsoft Purview, among other examples. The data quality tool 370 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
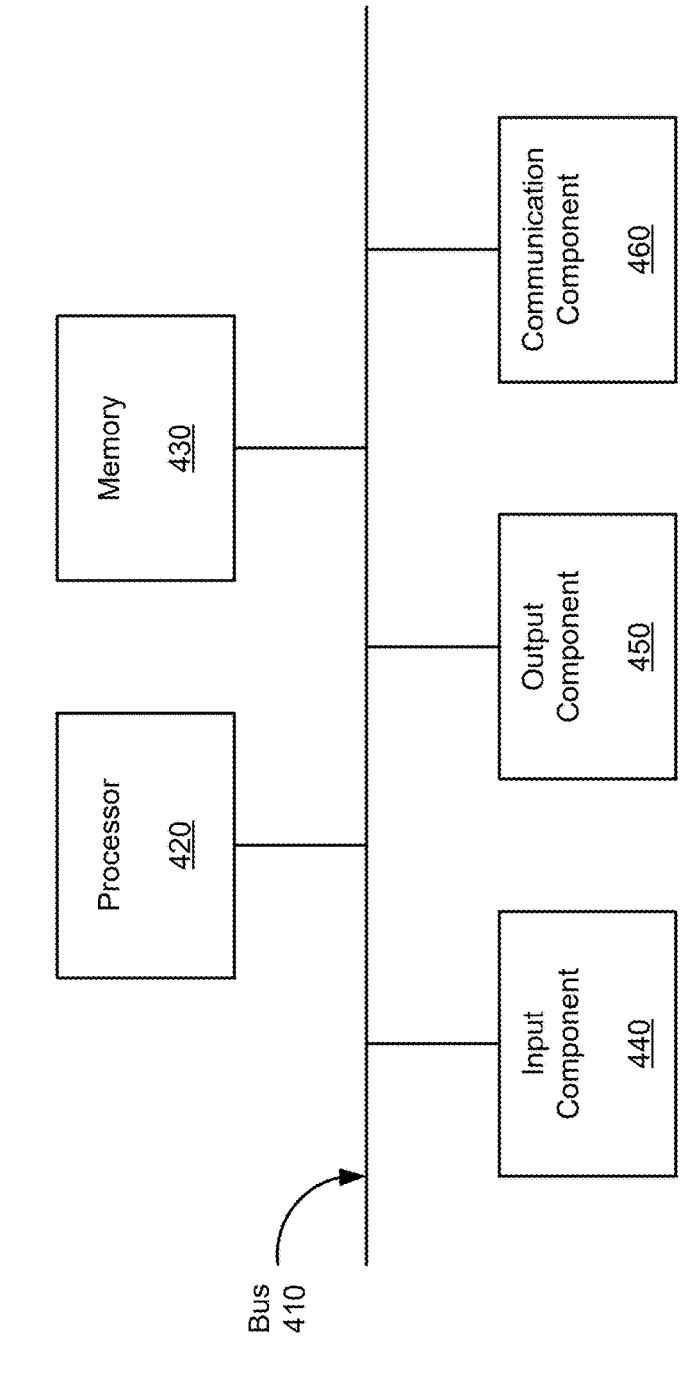
FIG. 4 is a diagram of example components of one or more devices of FIG. 3, in accordance with some embodiments of the present disclosure.

FIG. 4 is a diagram of example components of a device 400 associated with dataset and data lineage analysis. The device 400 may correspond to an administrator device 330, a dataset repository 340, a code repository 350, a data orchestrator 360, and/or a data quality tool 370. In some implementations, an administrator device 330, a dataset repository 340, a code repository 350, a data orchestrator 360, and/or a data quality tool 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection).

The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with dataset and data lineage analysis. In some implementations, one or more process blocks of FIG. 5 may be performed by an analysis system 301. In some implementations, one or more process blocks of FIG. 5 may be performed by another device or a group of devices separate from or including the analysis system 301, such as an administrator device 330, a dataset repository 340, a code repository 350, a data orchestrator 360, and/or a data quality tool 370. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving, using at least one first crawler, a set of configurations associated with a plurality of datasets (block 510). For example, the analysis system 301 (e.g., using processor 420, memory 430, and/or communication component 460) may receive, using at least one first crawler, a set of configurations associated with a plurality of datasets, as described above in connection with FIG. 1A. As an example, the analysis system 301 may receive, from a dataset repository, the set of configurations associated with the plurality of datasets. The analysis system 301 may transmit (to the dataset repository) a request, and the analysis system 301 may receive (from the dataset repository) the set of configurations in response to the request. In some implementations, the analysis system 301 may receive a set of configuration files (e.g., database configuration files and/or indices associated with the plurality of datasets, among other examples) that encode the set of configurations.

As further shown in FIG. 5, process 500 may include receiving, using at least one second crawler, a set of data lineages associated with the plurality of datasets (block 520). For example, the analysis system 301 (e.g., using processor 420, memory 430, and/or communication component 460) may receive, using at least one second crawler, a set of data lineages associated with the plurality of datasets, as described above in connection with FIG. 1B. As an example, the analysis system 301 may receive, from a code repository, the set of data lineages associated with the plurality of datasets. The analysis system 301 may transmit (to the code repository) a request, and the analysis system 301 may receive (from the code repository) the set of data lineages in response to the request. In some implementations, the analysis system 301 may receive metadata and/or scripts associated with the plurality of datasets, and the analysis system 301 may determine the set of data lineages from the metadata and/or the scripts.

As further shown in FIG. 5, process 500 may include determining a set of refresh schedules based on a set of run rates associated with the plurality of datasets (block 530). For example, the analysis system 301 (e.g., using processor 420, memory 430, and/or communication component 460) may determine a set of refresh schedules based on a set of run rates associated with the plurality of datasets, as described above in connection with reference number 145 of FIG. 1C. As an example, the analysis system 301 may receive, from a data orchestrator, the set of run rates associated with the plurality of datasets. The analysis system 301 may transmit (to the data orchestrator) a request, and the analysis system 301 may receive (from the data orchestrator) the set of run rates in response to the request.

As further shown in FIG. 5, process 500 may include receiving, using at least one third crawler, a set of data quality rules being applied to the plurality of datasets (block 540). For example, the analysis system 301 (e.g., using processor 420, memory 430, and/or communication component 460) may receive, using at least one third crawler, a set of data quality rules being applied to the plurality of datasets, as described above in connection with FIG. 1D. As an example, the analysis system 301 may receive, from a data quality tool, the set of data quality rules associated with the plurality of datasets. The analysis system 301 may transmit (to the data quality tool) a request, and the analysis system 301 may receive (from the data quality tool) the set of data quality rules in response to the request. In some implementations, the analysis system 301 may receive metadata, and the analysis system 301 may determine the set of data quality rules based on the metadata.

As further shown in FIG. 5, process 500 may include detecting an error with a particular dataset, in the plurality of datasets, using one or more of the set of configurations, the set of data lineages, the set of refresh schedules, or the set of data quality rules (block 550). For example, the analysis system 301 (e.g., using processor 420 and/or memory 430) may detect an error with a particular dataset, in the plurality of datasets, using one or more of the set of configurations, the set of data lineages, the set of refresh schedules, or the set of data quality rules, as described above in connection with reference number 180 of FIG. 1F. As an example, the analysis system 301 may detect a failure associated with a data lineage in the set of data lineages, a failure associated with a refresh schedule in the set of refresh schedules, and/or a failure associated with a data quality rule in the set of data quality rules.

As further shown in FIG. 5, process 500 may include transmitting an alert, to an administrator associated with the particular dataset, indicating the error (block 560). For example, the analysis system 301 (e.g., using processor 420, memory 430, and/or communication component 460) may transmit an alert, to an administrator associated with the particular dataset, indicating the error, as described above in connection with reference number 185 of FIG. 1F. As an example, the alert may be included in an email message, a text message, and/or a push notification, among other examples.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F and/or FIG. 2. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

FIG. 6 is a flowchart of an example process 600 associated with dataset and data lineage analysis. In some implementations, one or more process blocks of FIG. 6 may be performed by an administrator device 330. In some implementations, one or more process blocks of FIG. 6 may be performed by another device or a group of devices separate from or including the administrator device 330, such as an analysis system 301, a dataset repository 340, a code repository 350, a data orchestrator 360, and/or a data quality tool 370. Additionally, or alternatively, one or more process blocks of FIG. 6 may be performed by one or more components of the device 400, such as processor 420, memory 430, input component 440, output component 450, and/or communication component 460.

As shown in FIG. 6, process 600 may include receiving, from an analysis system, instructions for a UI that includes: an indication of a plurality of datasets and a set of data lineages associated with the plurality of datasets, a first graph depicting a set of data sources associated with the plurality of datasets, a second graph depicting quality associated with the plurality of datasets, a first table associated with metadata for at least one dataset in the plurality of datasets, and a second table associated with at least one data lineage in the set of data lineages (block 610). For example, the administrator device 330 (e.g., using processor 420, memory 430, and/or communication component 460) may receive, from an analysis system, instructions for a UI, as described above in connection with reference number 170 of FIG. 1E. The UI may include an indication of a plurality of datasets and a set of data lineages associated with the plurality of datasets, a first graph depicting a set of data sources associated with the plurality of datasets, a second graph depicting quality associated with the plurality of datasets, a first table associated with metadata for at least one dataset in the plurality of datasets, and a second table associated with at least one data lineage in the set of data lineages, as described above in connection with FIG. 2.

As further shown in FIG. 6, process 600 may include outputting the UI (block 620). For example, the administrator device 330 (e.g., using processor 420, memory 430, and/or output component 450) may output the UI, as described above in connection with reference number 175 of FIG. 1E. As an example, the administrator device 330 may output the UI visually (e.g., using a display or another type of output component 450) and/or auditorily (e.g., using a speaker or another type of output component 450).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1F and/or FIG. 2. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for analysis of datasets and data lineage, the system comprising:
one or more memories; and
one or more processors, communicatively coupled to the one or more memories, configured to:
receive, using at least one first crawler, a set of configurations associated with a plurality of datasets;
receive, using at least one second crawler, a set of data lineages associated with the plurality of datasets;
receive, from a data orchestrator, a set of run rates associated with the plurality of datasets;

determine a set of refresh schedules based on the set of run rates and at least one of metadata or script associated with the plurality of datasets;
receive, using at least one third crawler, a set of data quality rules being applied to the plurality of datasets;
detect an error with a particular dataset, in the plurality of datasets, using one or more of the set of configurations, the set of data lineages, the set of refresh schedules, or the set of data quality rules, wherein detecting the error comprises automatically identifying, via the one or more processors, failures in script execution, inaccessible data sources, missed refresh events, or non-compliance with data quality rules; and
transmit an alert, to an administrator associated with the particular dataset, indicating the error.

2. The system of claim 1, wherein the one or more processors are further configured to:
store the set of configurations, the set of data lineages, the set of refresh schedules, and the set of data quality rules in a storage controlled by the system.

3. The system of claim 1, wherein the one or more processors, to receive the set of configurations, are configured to:
receive a set of configuration files, encoding the set of configurations, using the at least one first crawler.

4. The system of claim 1, wherein the one or more processors, to receive the set of data lineages, are configured to:
receive metadata associated with the plurality of datasets;
receive one or more scripts associated with the plurality of datasets; and
determine the set of data lineages from the metadata and the one or more scripts.

5. The system of claim 1, wherein the one or more processors, to determine the set of refresh schedules, are configured to:
receive a set of run rates associated with at least a portion of the plurality of datasets; and
determine the set of refresh schedules based on the set of run rates.

6. The system of claim 1, wherein the one or more processors, to receive the set of data quality rules, are configured to:
receive first metadata associated with application of the set of data quality rules;
receive second metadata associated with application of a set of data protection rules; and
determine the set of data quality rules based on the first metadata and the second metadata.

7. The system of claim 1, wherein the error comprises a failure associated with a data lineage in the set of data lineages, a failure associated with a refresh schedule in the set of refresh schedules, or a failure associated with a data quality rule in the set of data quality rules.

8. A non-transitory computer-readable medium storing a set of instructions for analysis of datasets and data lineage, the set of instructions comprising:
one or more instructions that, when executed by one or more processors of a device, cause the device to:
receive, using at least one first crawler, a set of configurations associated with a plurality of data structures;
receive, using at least one second crawler, a set of data lineages associated with the plurality of data structures;

receive, using at least one third crawler, a set of quality rules being applied to the plurality of data structures;

detect an error with a particular data structure, in the plurality of data structures, using one or more of the set of configurations, the set of data lineages, or the set of quality rules, wherein detecting the error comprises automatically identifying failures in script execution, inaccessible data sources, missed refresh events, or non-compliance with data quality rules;

transmit an alert, to an administrator associated with the particular data structure, indicating the error;

generate at least one score for each data structure, in the plurality of data structures, using the set of configurations, the set of data lineages, and the set of quality rules; and transmit instructions for a user interface (UI) including the at least one score for each dataset.

9. The non-transitory computer-readable medium of claim 8, wherein the error comprises a failure associated with a data lineage in the set of data lineages or a failure associated with a quality rule in the set of quality rules.

10. The non-transitory computer-readable medium of claim 8, wherein the one or more instructions, that cause the device to transmit the instructions for the UI, cause the device to:

transmit instructions for a pie chart representing the at least one score for each dataset.

11. The non-transitory computer-readable medium of claim 8, wherein the one or more instructions, that cause the device to transmit the instructions for the UI, cause the device to:

transmit instructions for a bar graph representing the at least one score for each dataset.

12. The non-transitory computer-readable medium of claim 8, wherein the plurality of data structures comprise a plurality of machine learning models.

13. The non-transitory computer-readable medium of claim 8, wherein the plurality of data structures comprise a plurality of application programming interfaces.

14. The non-transitory computer-readable medium of claim 8, wherein the one or more instructions, when executed by the one or more processors, further cause the device to:

provide at least one of the set of configurations, the set of data lineages, or the set of data quality rules, to a machine learning model trained by at least one of labeled information about datasets or unlabeled information about datasets, wherein the machine learning model is configured to cluster the plurality of data structures with other related data structures, wherein generating the at least one score for each data structure is based on an output of a set of scores from the machine learning model.

15. A method comprising:

receiving, by a device and using at least one first crawler, a set of configurations associated with a plurality of datasets;

receiving, by the device and using at least one second crawler, a set of data lineages associated with the plurality of datasets;

receiving, by the device and from a data orchestrator, a set of run rates associated with the plurality of datasets;

determining, by the device, a set of refresh schedules based on the set of run rates and at least one of metadata or script associated with the plurality of datasets;

receiving, by the device and using at least one third crawler, a set of data quality rules being applied to the plurality of datasets;

detecting, by the device, an error with a particular dataset, in the plurality of datasets, using one or more of the set of configurations, the set of data lineages, the set of refresh schedules, or the set of data quality rules, wherein detecting the error comprises automatically identifying, by the device, one or more failures in script execution, inaccessible data sources, missed refresh events, or non-compliance with data quality rules; and transmitting, by the device, an alert indicating the error.

16. The method of claim 15, further comprising:

generating at least one score for each dataset, of the plurality of datasets, using the set of configurations, the set of data lineages, and the set of quality rules; and transmitting instructions for a user interface (UI) including the at least one score for each dataset.

17. The method of claim 15, further comprising:

receiving metadata associated with the plurality of datasets;

receiving one or more scripts associated with the plurality of datasets; and determining the set of data lineages from the metadata and the one or more scripts.

18. The method of claim 15, further comprising:

receiving a set of run rates associated with at least a portion of the plurality of datasets; and determining the set of refresh schedules based on the set of run rates.

19. The method of claim 15, further comprising:

storing the set of configurations, the set of data lineages, the set of refresh schedules, and the set of data quality rules.

20. The method of claim 15, further comprising:

receiving a set of configuration files, encoding the set of configurations, using the at least one first crawler.

* * * * *